Patented Sept. 6, 1938

2,129,287

UNITED STATES PATENT OFFICE 2,129,287

ALTERNATING CURRENT MEASURING DEVICE

Rudolf Schienemann, Berlin, Germany, assignor to Telefunken Gesellschaft für Drahtlose Telegraphie, m. b. H., Berlin, Germany, a corporation of Germany Application December 2, 1936, Serial No. 113,941
In Germany November 30, 1935

10 Claims. (Cl. 179—171)

The invention relates broadly to apparatus for measuring the amplitude of an alternating potential, and more particularly to an apparatus for determining when the alternating potential to be measured passes below a definite minimum value which is selectable at will.

An arrangement of this type is, for instance, applicable to modulation measuring apparatus for determining the amplitude of the smallest carrier frequency amplitude of a modulated alternating potential.

Where the carrier frequency of potential is modulated by audio note as, for instance, a vocal or musical note, the smallest carrier frequency amplitude may easily be determined by measuring the maximum amplitude and comparing this measurement with the average carrier amplitude value, which is constant in the so-called telephony modulation. If, on the other hand, carrier wave is modulated by video signals for television purposes, the average carrier amplitude is no longer constant for the reason that the average density of the picture to be televised represents a direct current that increases or decreases the average carrier amplitude in accordance with the background of the picture. Accordingly, as long as the modulation potential contains a direct current component, a checking of the modulating action cannot be accomplished by measuring the maximum and constant average carrier wave amplitude values.

It is therefore an object of this invention to provide an apparatus in which such a modulated carrier as referred to above may be measured even when the modulating potential contains a varying direct current component.

In accordance with the invention, the amplitude of an alternating potential passing below a definite minimum value, which is selectable, is determined by comparing the amplitude to be measured with another alternating potential synchronous therewith, but of opposite phase, and these two potentials are fed to two electrodes of a high vacuum discharge tube in such a manner when the wave to be measured passes below a definite selectable minimum value, this is readily indicated by measuring apparatus in the output circuit of the tube.

Figure 1:
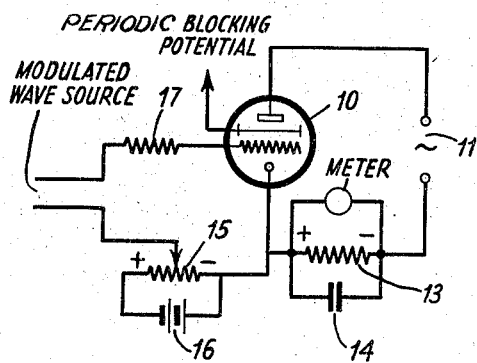
Figure 4:
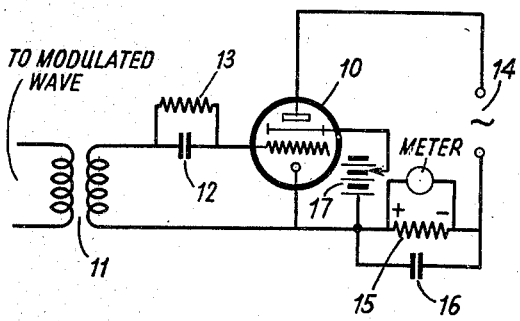
Figure 2:
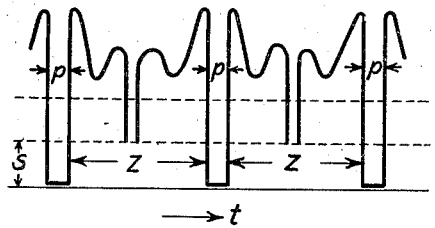
Figure 5A:
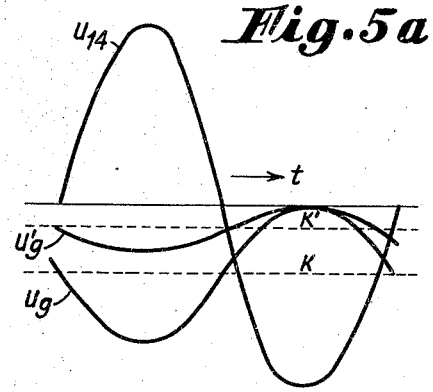
Figure 3:
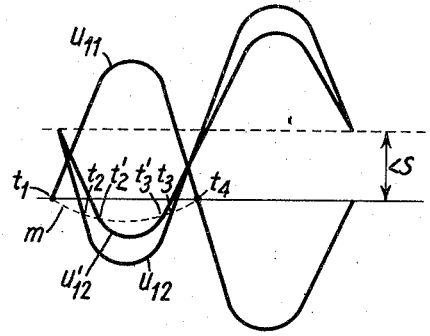
Figure 5B:
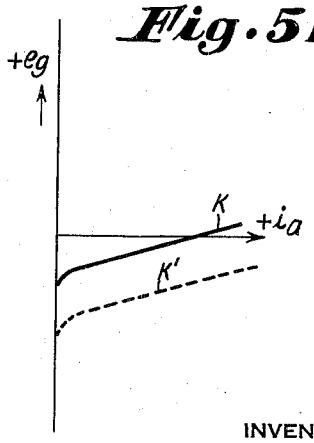

My invention will be best understood by reference to the accompanying drawing in which:

Fig. 1 shows an embodiment of my invention,
Fig. 2 is an exemplary alternating potential, and
Fig. 3 is an explanatory curve,
Fig. 4 is another embodiment of my invention, and
Figs. 5a and 5b are explanatory curves.

It is assumed that a finite carrier wave amplitude corresponds to black in the image to be televised, and that the carrier wave amplitude is increased with the transmission of the brighter image spots, and the carrier amplitude is modulated in a blacker than black direction or, in other words, decreases below the above-mentioned finite value for the purposes of transmitting synchronizing signals.

Referring to Fig. 1, a vacuum tube 10, shown here as a screen grid tube, has impressed on its anode a constant amplitude alternating potential 11 of the frequency of the carrier to be measured. The carrier to be measured 12 is impressed on a control grid of the tube. In the anode circuit of the tube is a condenser 14 and a resistance 13. For the purposes of simplicity, the screen biasing potential is not illustrated. For the purpose of this arrangement, the control grid is biased to a value slightly smaller than the minimum amplitude to be measured (see S in Fig. 2). The control grid circuit contains a potentiometer 15 which is energized by a biasing member 16, which arrangement allows an adjustable initial bias value for the control grid of the tube. A resistance member 17 is also joined to the control grid tube.

Referring to Fig. 2, there is shown an exemplary carrier which has been modulated by video signal. The minimum amplitude which is selectable is represented by S, the synchronizing signals are shown as modulating the carrier in a blacker than black direction and their spacing is indicated by $p$, the time interval between synchronizing signals is illustrated by Z, and the whole curve represents the amplitude of the carrier wave with respect to time.

The action of the device is as follows: Referring to Fig. 3, the alternating plate potential furnished from the source 11 is illustrated as U—11, and the incoming carrier frequency is illustrated as U—12. These waves are opposite in phase. The zero of the grid alternating potential is moved by the biasing arrangement explained above from the zero line of the plate potential in a positive direction increasingly by an amount smaller than S which is the minimum desired amplitude with respect to zero or a predetermined reference value. With this arrangement, a plate current will flow in tube 10 only during the positive half waves of the plate potential 11. Curve $m$ indicates the minimum value of grid potential which will allow a flow of current through the tube when the potential U—11 illustrated in the figure is impressed on the plate circuit. This curve may easily be determined from the characteristic of the tube.

Now, with grid potential values above the value illustrated in curve $m$, a plate current will flow, while with grid potential values below the value illustrated by the curve the plate current is blocked during the positive half cycle of the alternating potential 11. Now, at a time $t_1$ of a positive half cycle of potential U—11, a small plate potential exists and a definite plate current flows since the positive grid biasing direct potential is greater than the grid alternating potential U—12, which is negative at this moment. There will be a potential drop across resistance 13 occasioned by this plate current. From the time $t_2$ until the time $t_3$, potential U—12, the grid potential, is larger than the positive grid biasing direct potential and accordingly no plate current flows. Again, from $t_3$ until $t_4$ the positive grid biasing direct potential predominates and the plate current again has a small finite value. Now, the period between $t_2$ and $t_3$ during which the plate current is interrupted depends on the amplitude of the grid alternating potential which in this case is the carrier frequency to be measured. The reason for this is shown clearly in the curve in which U'—12 is an exemplary half cycle of the carrier which is smaller than U—12 explained immediately preceding. Now, if the grid alternating potential varies in accordance with the curve U'—12, there flows a plate current during which positive half cycle of the potential U—11 from $t_1$ to $t_2'$ and from $t_3'$ to $t_4$. Accordingly, the potential across the resistance condenser unit 13, 14, whose time constant is assumed as being a little greater than the period of the carrier wave, will be greater as the amplitude of the potential U—12 becomes smaller. By suitably calibrating the measuring instrument this potential may be easily indicated when U—12 passes below a definite amplitude. The measuring instrument might, for instance, be substituted directly for the resistance member 13.

In order that no indication will be given during the interval shown as $p$ in Fig. 2 when the synchronizing signals are set and at which time the carrier naturally falls below the desired finite amplitude, the screen grid of tube 10 is energized by a blocking potential which cuts off the tube for this period. It will be appreciated that this may be accomplished by well-known means. For instance, it is possible to provide a square wave oscillator of the types such as are well-known at the present time, the said oscillator to have a frequency the same as that of the synchronizing signals identified as $p$. The potential output then of this generator may be appropriately impressed on the screen grid of the tube 10 to block current flow in the tube during the period $p$. Since this particular means might be used or since a number of different well-known forms might be used, and further since this element per se does not comprise my invention, it will be appreciated that any well-known means for developing a blocking potential periodically at a definite frequency might be aptly used.

By means of adjustment of the potentiometer 15, the potentiometer may be calibrated in values of the alternating current amplitude for the constant deflection of the measuring instrument connected to resistance condenser combination 13, 14, each position of the potentiometer corresponding to a definite minimum amplitude of the carrier to be measured.

Referring to Fig. 4, there is shown another embodiment of my invention. In this figure likewise there is used a screen grid tube 10 having joined to a control grid an input transformer 11 and a condenser resistance combination 12, 13. The plate circuit is energized by the alternating potential 14, and joined with the plate circuit is a resistance condenser combination 15, 16. The screen grid is biased by an adjustable biasing arrangement shown as a sliding arm arrangement joined to a direct current source of potential 17.

The operation of this arrangement will be best understood by reference to Figs. 5a and 5b. As in the preceding arrangement, the potential supplied to the plate by the alternating source 14 is represented in Fig. 5a by the curve U—14. A modulating alternating potential impressed from transformer 11 onto the control grid of tube 10 is impressed in opposite phase to that of the alternating current source 14, and the curve is represented in Fig. 5a by $U_g$.

Referring to Fig. 5b, if the normal plate-current grid-voltage characteristic of the tube be plotted, it will assume a curve as shown by K. Now, it will be seen that with a grid potential represented by $U_g$, a plate current will flow during the positive half cycles of the source 14 when the grid potential $U_g$ is lower than the dotted portion $k$. Now, by properly biasing the screen grid of tube 10, the characteristic of the tube curve may be so determined as to change its position to the position K'. Now no plate current will flow in the output circuit of the tube on the positive half cycles of the source 14 until the wave to be measured passes below the value represented by the dotted portion marked $k'$. Thus, it is seen that by adjusting the screen potential, the point at which a current flows in the output circuit of a tube may be adjusted at will. This value may be set as the minimum amplitude to be measured, and when this is done, there will be no reading on the meter in the output circuit of the tube until the wave has fallen below the established minimum value, which usually is representative of picture black. As in the previous arrangement, a blocking potential may be fed to the screen grid of the tube during the receipt of synchronizing pulses.

I claim:

1. In an apparatus for measuring the amplitude of an alternating current wave, a vacuum tube including anode, cathode, and control electrodes, a source of alternating current potential of the same frequency as and of opposing phase to that to be measured for supplying operating voltages to the anode of said tube, means for impressing the alternating current wave to be measured onto the control electrode of the tube, adjustable biasing means adapted to bias the control electrode of said tube, an electrical storage element connected in the output circuit of said tube, means for periodically blocking said tube, and means for measuring the potentials developed across said storage element.

2. In an apparatus for measuring the amplitude of an alternating current wave, a vacuum tube including anode, cathode, and control electrodes, a source of alternating current potential of the same frequency as and of opposing phase to that to be measured for supplying operating voltages to the anode of said tube, means for impressing the alternating current wave to be measured onto the control electrode of the tube, adjustable biasing means adapted to bias the control electrode of said tube, a resistance and capacity combination joined in parallel connected in the output circuit of said tube, means for periodically blocking said tube, and means for measuring the potentials developed across said combination.

3. In an apparatus for measuring the amplitude of an alternating current wave, a vacuum tube including anode, cathode, and control electrodes, a source of alternating current potential of the same frequency as and of opposing phase to that to be measured for supplying operating voltages to the anode of said tube, means for impressing the alternating current wave to be measured onto the control electrode of the tube, adjustable biasing means adapted to bias the control electrode of said tube, a resistance joined in series with the control grid of said tube, an electrical storage element connected in the output circuit of said tube, means for periodically blocking said tube, and means for measuring the potentials developed across said storage element.

4. In an apparatus for measuring the amplitude of an alternating current wave, a vacuum tube including anode, cathode, and control electrodes, a source of alternating current potential of the same frequency as and of opposing phase to that to be measured for supplying operating voltages to the anode of said tube, means for impressing the alternating current wave to be measured onto the control electrode of the tube, adjustable biasing means adapted to bias the control electrode of said tube, a resistance joined in series with the control grid of said tube, a resistance and capacity combination joined in parallel connected in the output circuit of said tube, means for periodically blocking said tube, and means for measuring the potentials developed across said combination.

5. In an apparatus for measuring the amplitude of an alternating current wave, a vacuum tube including anode, cathode, control and screen electrodes, means for impressing on the screen electrode of said tube a blocking potential at predeterminable intervals for a predeterminable period to render said tube non-conducting during said periods, a source of alternating current potential of the same frequency as that to be measured for supplying operating voltages to the anode of said tube, means for impressing the alternating current wave to be measured onto the control electrode of the tube, adjustable biasing means adapted to bias the control electrode of said tube, an electrical storage element connected in the output circuit of said tube, and means for measuring the potentials developed across said storage element.

6. In an apparatus for measuring the amplitude of an alternating current wave, a vacuum tube including anode, cathode, control and screen electrodes, means for impressing on the screen electrode of said tube a blocking potential at predeterminable intervals for a predeterminable period to render said tube non-conducting during said periods, a source of alternating current potential of the same frequency as that to be measured for supplying operating voltages to the anode of said tube, means for impressing the alternating current wave to be measured onto the control electrode of the tube, adjustable biasing means adapted to bias the control electrode of said tube, a resistance and capacity combination joined in parallel connected in the output circuit of said tube, and means for measuring the potentials developed across said combination.

7. In an apparatus for measuring the amplitude of an alternating current wave, a vacuum tube including anode, cathode, control and screen electrodes, means for impressing on the screen electrode of said tube a blocking potential at predeterminable intervals for a predeterminable period to render said tube non-conducting during said periods, a source of alternating current potential of the same frequency as that to be measured for supplying operating voltages to the anode of said tube, means for impressing the alternating current wave to be measured onto the control electrode of the tube, adjustable biasing means adapted to bias the control electrode of said tube, a resistance joined in series with the control grid of said tube, an electrical storage element connected in the output circuit of said tube, and means for measuring the potentials developed across said storage element.

8. In an apparatus for measuring the amplitude of an alternating current wave, a vacuum tube including anode, cathode, control and screen electrodes, means for impressing on the screen electrode of said tube a blocking potential at predeterminable intervals for a predeterminable period to render said tube non-conducting during said periods, a source of alternating current potential of the same frequency as that to be measured for supplying operating voltages to the anode of said tube, means for impressing the alternating current wave to be measured onto the control electrode of the tube, adjustable biasing means adapted to bias the control electrode of said tube, a resistance joined in series with the control grid of said tube, a resistance and capacity combination joined in parallel connected in the output circuit of said tube, and means for measuring the potentials developed across said combination.

9. In an apparatus for measuring the amplitude of an alternating current wave, a vacuum tube including anode, cathode, control and screen electrodes, means for impressing on the screen electrode of said tube a blocking potential at predeterminable intervals for a predeterminable period to render said tube non-conducting during said periods, a source of direct current potential for adjustably biasing said screen electrode, a source of alternating current potential of the same frequency as that to be measured for supplying operating voltages to the anode of said tube, means for impressing the alternating current wave to be measured onto the control electrode of the tube, adjustable biasing means adapted to bias the control electrode of said tube, a resistance joined in series with the control grid of said tube, an electrical storage element connected in the output circuit of said tube, and means for measuring the potentials developed across said storage element.

10. In an apparatus for measuring the amplitude of an alternating current wave, a vacuum tube including anode, cathode, control and screen electrodes, means for impressing on the screen electrode of said tube a blocking potential at predeterminable intervals for a predeterminable period to render said tube non-conducting during said periods, a source of direct current potential for adjustably biasing said screen electrode, a source of alternating current potential of the same frequency as that to be measured for supplying operating voltages to the anode of said tube, means for impressing the alternating current wave to be measured onto the control electrode of the tube, adjustable biasing means adapted to bias the control electrode of said tube, a resistance joined in series with the control grid of said tube, a resistance and capacity combination joined in parallel connected in the output circuit of said tube, and means for measuring the potentials developed across said combination.

RUDOLF SCHIENEMANN.